US010470167B2

(12) United States Patent
Lee et al.

(10) Patent No.: US 10,470,167 B2
(45) Date of Patent: Nov. 5, 2019

(54) METHOD OF TRANSMITTING AND RECEIVING UCI IN WIRELESS COMMUNICATION SYSTEM AND APPARATUS THEREFOR

(71) Applicant: LG Electronics Inc., Seoul (KR)

(72) Inventors: Sangrim Lee, Seoul (KR); Hojae Lee, Seoul (KR); Dongkyu Kim, Seoul (KR); Myeongjin Kim, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/440,271

(22) Filed: Feb. 23, 2017

(65) Prior Publication Data

US 2018/0124773 A1    May 3, 2018

Related U.S. Application Data

(60) Provisional application No. 62/415,520, filed on Nov. 1, 2016.

(51) Int. Cl.
*H04W 72/04* (2009.01)
*H04L 5/00* (2006.01)
*H04W 72/12* (2009.01)

(52) U.S. Cl.
CPC ....... *H04W 72/0413* (2013.01); *H04L 5/0053* (2013.01); *H04L 5/0055* (2013.01);
(Continued)

(58) Field of Classification Search
CPC ... H04L 1/1861; H04L 5/0053; H04L 5/0055; H04L 72/0406; H04L 72/0413;
(Continued)

(56) References Cited

U.S. PATENT DOCUMENTS

2012/0039279 A1\* 2/2012 Chen ............... H04L 1/1861
370/329
2012/0257552 A1\* 10/2012 Chen ............... H04L 5/001
370/280
(Continued)

FOREIGN PATENT DOCUMENTS

KR  10-2010-0071791 A  6/2010
WO     2010/002307 A1  1/2010

OTHER PUBLICATIONS

Intel Corporation: "Scheduling request design for NR", R1-1610191, 3GPP TSG-RAN WG1 Meeting #86bis, Lisbon, Portugal, Oct. 10-14, 2016.

*Primary Examiner* — Khoa Huynh
(74) *Attorney, Agent, or Firm* — Dentons US LLP

(57) ABSTRACT

A method of transmitting uplink control information (UCI) by a user equipment in a wireless communication system, includes the steps of receiving downlink control information (DCI) indicating a transmission time of the UCI through a prescribed frequency band in a first subframe, receiving a downlink data based on the DCI, and transmitting UCI associated with the downlink data in a second subframe based on the indicated transmission time of the UCI. In this case, the prescribed frequency band on which the DCI is transmitted is configured by a plurality of DCCUs (downlink control channel units) for transmitting the DCI, and the UCI may be transmitted on an UCCU (uplink control channel unit) in the second subframe, a frequency band of the first UCCU being same as a frequency band corresponding to a DCCU of a lowest frequency among the plurality of DCCUs.

16 Claims, 5 Drawing Sheets

(52) U.S. Cl.
CPC ......... *H04L 5/0091* (2013.01); *H04W 72/042* (2013.01); *H04W 72/1268* (2013.01); *H04W 72/0453* (2013.01)

(58) Field of Classification Search
CPC ............... H04L 72/042; H04L 72/0446; H04L 72/0453; H04L 5/0067; H04L 5/0091; H04W 72/0406; H04W 72/0413; H04W 72/042; H04W 72/0446; H04W 72/0453; H04W 72/1268
See application file for complete search history.

(56) References Cited

U.S. PATENT DOCUMENTS

| | | | |
|---|---|---|---|
| 2015/0230234 A1 | 8/2015 | Choi et al. | |
| 2016/0073394 A1 | 3/2016 | Kim et al. | |
| 2017/0289993 A1* | 10/2017 | Yerramalli | ............ H04L 1/1864 |
| 2018/0019843 A1* | 1/2018 | Papasakellariou | .... H04L 1/1822 |

* cited by examiner

METHOD OF TRANSMITTING AND RECEIVING UCI IN WIRELESS COMMUNICATION SYSTEM AND APPARATUS THEREFOR

This application claims the benefit of the U.S. Provisional Patent Application No. 62/415,520, filed on Nov. 1, 2016, which is hereby incorporated by reference as if fully set forth herein.

BACKGROUND OF THE INVENTION

Field of the Invention

The present invention relates to a wireless communication, and more particularly, to a method of transmitting and receiving UCI in a wireless communication system and an apparatus therefor.

Discussion of the Related Art

As more communication devices require greater communication capacity, necessity for mobile broadband communication, which is enhanced compared to a legacy radio access technology (RAT), is emerging. And, a massive MTC (machine type communication) for providing various services at anytime and anywhere by connecting a plurality of devices and objects with each other also corresponds to one of main issues to be considered in a next generation communication.

Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

SUMMARY OF THE INVENTION

Accordingly, the present invention is directed to an apparatus and method thereof that substantially obviate one or more problems due to limitations and disadvantages of the related art.

A technical task of the present invention is to provide a method for a user equipment to transmit UCI (uplink control information) in a wireless communication system.

Another technical task of the present invention is to provide a method for a base station to receive UCI (uplink control information) in a wireless communication system.

Another technical task of the present invention is to provide a user equipment configured to transmit UCI (uplink control information) in a wireless communication system.

The other technical task of the present invention is to provide a base station configured to receive UCI (uplink control information) in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting UCI (uplink control information) by a user equipment in a wireless communication system, includes the steps of receiving DCI (downlink control information) indicating transmission time of the UCI through a prescribed frequency band in a first subframe, receiving a downlink data based on the DCI, and transmitting UCI associated with the downlink data in a second subframe based on the indicated transmission time of the UCI. In this case, the prescribed frequency band on which the DCI is transmitted is configured by a plurality of DCCUs (downlink control channel units) for transmitting the DCI, and the UCI may be transmitted on an UCCU (uplink control channel unit) the second subframe, a frequency band of the first UCCU being same as a frequency band corresponding to a DCCU of a lowest frequency among the plurality of DCCUs.

If the DCI further indicates a number of repetition transmission times in a frequency domain of the UCI, the UCI may be repeatedly transmitted in the second subframe through a second UCCU of a frequency band identical to a DCCU of a highest frequency band among the plurality of DCCUs based on the number of repetition transmission times.

If the DCI further indicates a number of repetition transmission times in the time domain of the UCI, the UCI may be repeatedly transmitted in a third subframe through the first UCCU of a frequency band i based on the number of repetition transmission times.

The UCI may be transmitted through a last symbol in the second subframe and the UCI may include a HARQ ACK/NACK signal. The plurality of DCCUs are multiplexed by a frequency division multiplexing scheme and each of the plurality of DCCUs may be configured by a bundle of resource elements (REs).

To further achieve these objects and other advantages and in accordance with the purpose of the invention, as embodied and broadly described herein, according to a different embodiment, a method of receiving UCI (uplink control information by a base station in a wireless communication system, includes the steps of transmitting DCI (downlink control information) indicating transmission time of the UCI through a prescribed frequency band in a first subframe, transmitting a downlink data based on the DCI, and receiving UCI associated with the downlink data in a second subframe based on the indicated transmission time of the UCI. In this case, the prescribed frequency band on which the DCI is transmitted is configured by a plurality of DCCUs (downlink control channel units) for transmitting the DCI and the UCI may be received on a first UCCU (uplink control channel unit) in the second subframe, a frequency band of the first UCCU being same as a frequency band corresponding to a DCCU of a lowest frequency among the plurality of DCCUs.

If the DCI further indicates a number of repetition transmission times in a frequency domain of the UCI, the UCI may be repeatedly received in the second subframe through a second UCCU based on the number of repetition transmission times, a frequency band of the second UCCU being same as a frequency band corresponding to a DCCU of a highest frequency among the plurality of the DCCUs.

If the DCI further indicates a number of repetition transmission times in the time domain of the UCI, the UCI may be repeatedly received in a third subframe through the first UCCU based on the number of repetition transmission times.

To further achieve these objects and other advantages and in accordance with the purpose of the invention, as embodied and broadly described herein, according to a further different embodiment, a user equipment for transmitting UCI (uplink control information) in a wireless communication system includes a receiver, a transmitter, and a processor, the processor configured to control the receiver to receive DCI (downlink control information) indicating transmission time of the UCI through a prescribed frequency band in a first subframe and receive a downlink data based on the DCI, the processor configured to control the transmitter to transmit UCI associated with the downlink data in a second subframe based on the indicated transmission time of the UCI. In this case, the prescribed frequency band on which the DCI is transmitted is configured by a plurality of DCCUs (downlink control channel units) for transmitting the DCI and the processor may control the transmitter to transmit the UCI on a first UCCU (uplink control channel unit) in the second subframe, a frequency band of the first UCCU being same as a frequency band corresponding to a DCCU of a lowest frequency among the plurality of DCCUs.

If the DCI further indicates a number of repetition transmission times in a frequency domain of the UCI, the processor may control the transmitter to repeatedly transmit the UCI in the second subframe through a second UCCU based on the number of repetition transmission times, a frequency band of the second UCCU being same as a frequency band corresponding to a DCCU of a highest frequency among the plurality of DCCUs.

If the DCI further indicates a number of repetition transmission times in the time domain of the UCI, the processor may control the transmitter to repeatedly transmit the UCI in a third subframe through the first UCCU based on the number of repetition transmission times.

To further achieve these objects and other advantages and in accordance with the purpose of the invention, as embodied and broadly described herein, according to a further different embodiment, a base station for receiving UCI (uplink control information) in a wireless communication system includes a transmitter, a receiver, and a processor, the processor configured to control the transmitter to transmit DCI (downlink control information) indicating transmission time of the UCI through a prescribed frequency band in a first subframe and transmit a downlink data based on the DCI, the processor configured to control the receiver to receive UCI associated with the downlink data in a second subframe based on the indicated transmission time of the UCI. In this case, the prescribed frequency band on which the DCI is transmitted is configured by a plurality of DCCUs (downlink control channel units) for transmitting the DCI and the processor may control the receiver to receive the UCI on a first UCCU (uplink control channel unit) in the second subframe, a frequency band of the first UCCU being same as a frequency band corresponding to a DCCU of a lowest frequency among the plurality of DCCUs.

If the DCI further indicates a number of repetition transmission times in a frequency domain of the UCI, the processor may control the receiver to repeatedly receive the UCI in the second subframe through a second UCCU based on the number of repetition transmission times.

If the DCI further indicates a number of repetition transmission times in the time domain of the UCI, the processor may control the receiver to repeatedly receive the UCI in a third subframe through the first UCCU based on the number of repetition transmission times.

According to one embodiment of the present invention, it is able to expect good communication performance by utilizing DL/UL reciprocity based on a self-contained structure according to DCI and UCI linkage method in New RAT.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
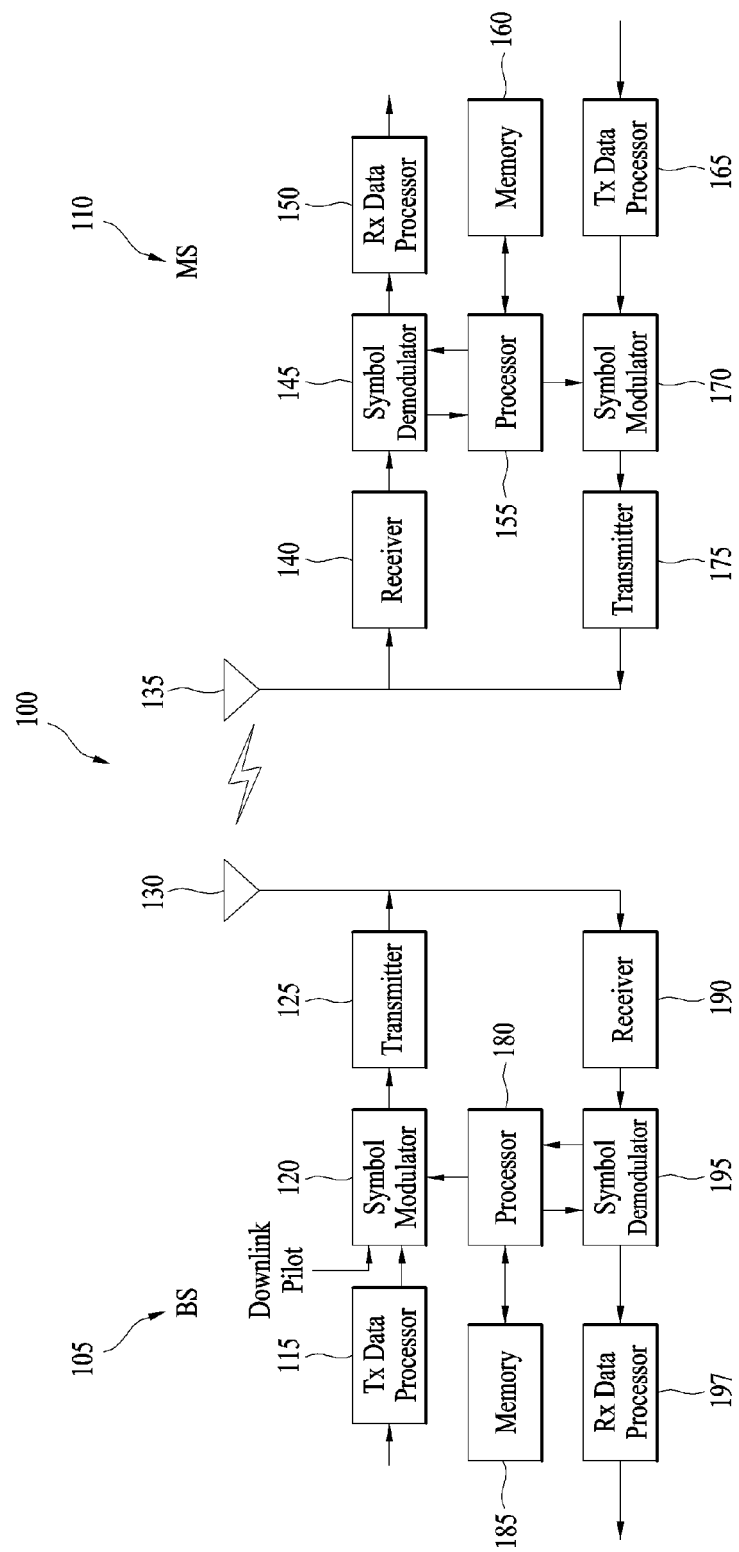
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system, 3GPP LTE-A, or 5G system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
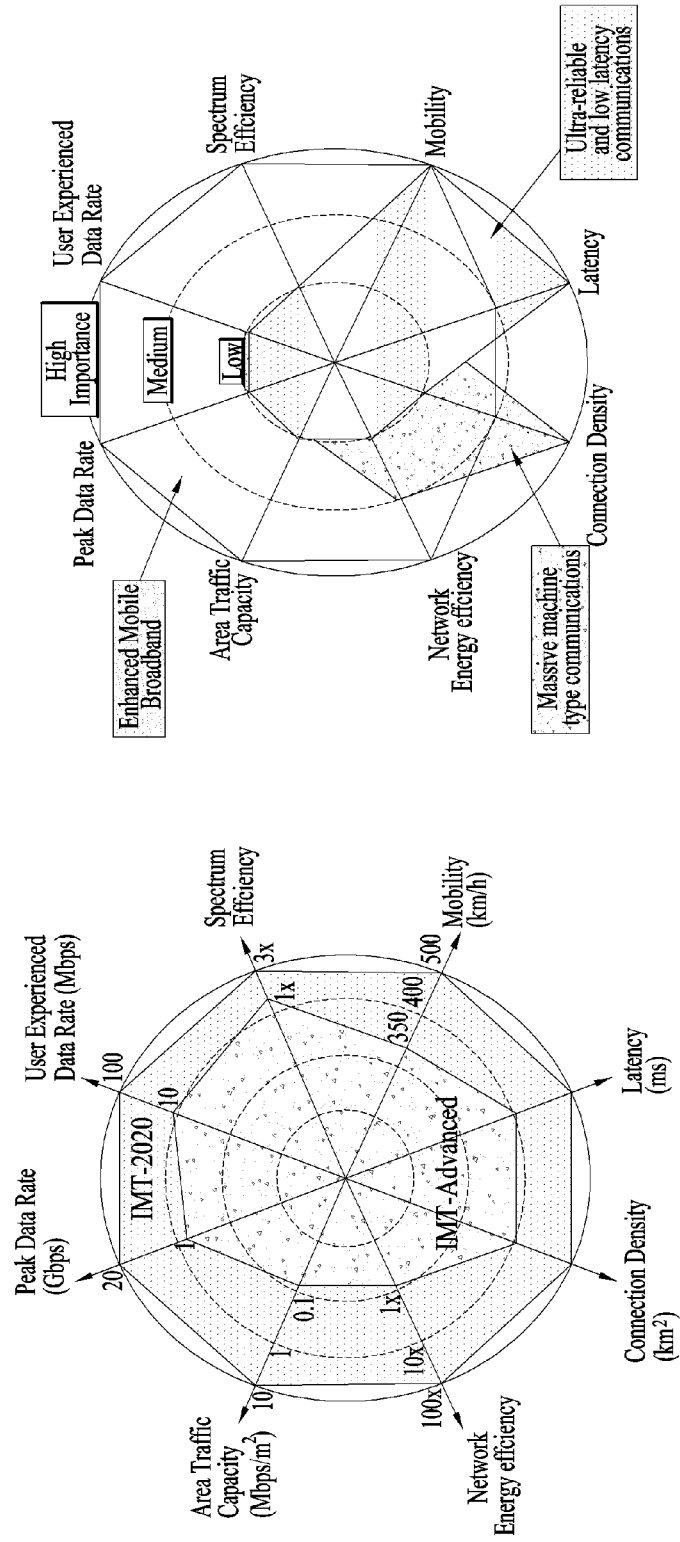
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 shows correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <$10^{-6}$).

Figure 3:
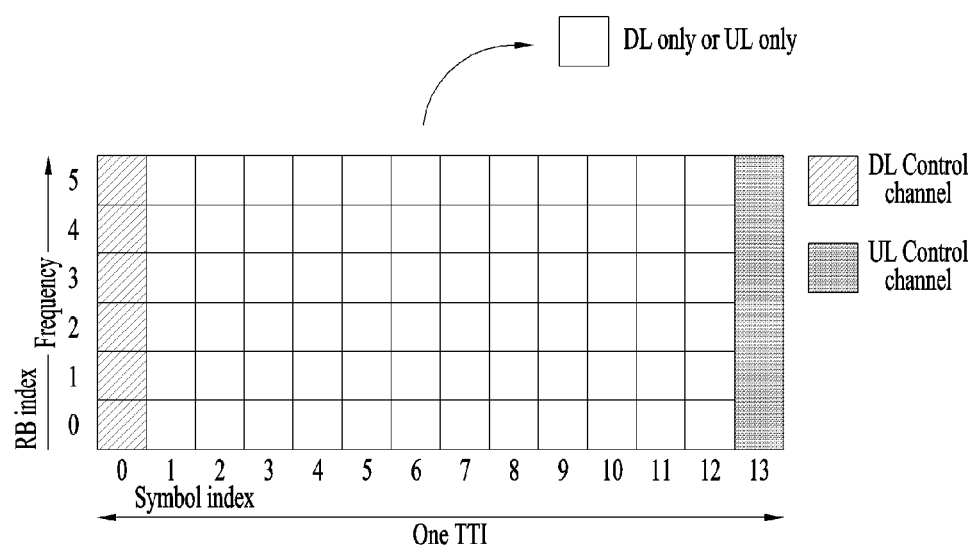
FIG. 3 is a diagram for an example of a subframe structure that TDM is performed on a data channel and a control channel.

FIG. 3 is a diagram for an example of a subframe structure that TDM scheme is applied between a data channel and a control channel.

FIG. 3 shows a subframe that a data channel and a control channel are TDM (time division multiplexed). Referring to FIG. 3, a slashed region corresponds to a downlink control region (i.e., a resource region in which a downlink control channel is transmitted) and a part represented by black color corresponds to an uplink control region (i.e., a resource region in which an uplink control channel is transmitted). In the subframe shown in FIG. 2, a region having no sign can be used not only for downlink data transmission but also for uplink data transmission. As a characteristic of the aforementioned structure, downlink (DL) transmission and uplink (UL) transmission are sequentially performed in a subframe. Hence, it may transmit DL data and receive UL ACK/NACK in a subframe. As a result, when a data transmission error occurs, it may be able to reduce time taken for retransmission and minimize latency of final data transmission.

In the subframe structure that the data channel and the control channel are TDM, in order for a base station and a UE to switch to a reception mode from a transmission mode or switch to the transmission mode from the reception mode, it is necessary to have a time gap. To this end, a partial OFDM (orthogonal frequency division multiplexing) symbol at the time of switching to UL from DL is set to a guard period (GP) in the subframe structure.

In FIG. 3, a slashed region corresponds to a region in which a physical downlink control channel (e.g., physical downlink control channel (PDCCH)) for forwarding DCI (downlink control information) is transmitted and the last symbol corresponds to a region in which a physical uplink control channel (e.g., physical uplink control channel (PUCCH)) for forwarding UCI (uplink control information) is transmitted. In this case, the DCI, which is control information forwarded to a UE by an eNB, can include information on a cell configuration to be used by the UE, DL specific information such as DL scheduling and the like, UL specific information such as a UL grant and the like, etc. And, the UCI, which is control information forwarded to the eNB by the UE, can include HARQ ACK/NACK report for DL data, CSI report for DL channel state, SR (scheduling request), etc.

In FIG. 3, downlink control region (i.e., a resource region in which a downlink control channel is transmitted) and a part represented by black color corresponds to an uplink control region (i.e., a resource region in which an uplink control channel is transmitted). In the subframe shown in FIG. 2, a region having no sign can be used not only for downlink data transmission but also for uplink data transmission. As a characteristic of the aforementioned structure, downlink (DL) transmission and uplink (UL) transmission are sequentially performed in a subframe. Hence, it may transmit DL data and receive UL ACK/NACK in a subframe. As a result, when a data transmission error occurs, it may be able to reduce time taken for retransmission and minimize latency of final data transmission.

In FIG. 3, a region having no sign can be used not only for a data channel (e.g., physical downlink shared channel) for transmitting downlink data but also for a data channel (e.g., physical uplink shared channel (PUSCH)) for transmitting uplink data. As a characteristic of the aforementioned structure, downlink (DL) transmission and uplink (UL) transmission are sequentially performed in a subframe. Hence, an eNB can transmit DL data and receive HARQ ACK/NACK signal in response to the DL data in a subframe. As a result, when a data transmission error occurs, it may be able to reduce time taken for retransmission and minimize latency of final data transmission.

In the aforementioned self-contained subframe structure, in order for a base station and a UE to switch to a reception mode from a transmission mode or switch to the transmission mode from the reception mode, it is necessary to have a time gap. To this end, a partial OFDM symbol at the time of switching to UL from DL is configured as a guard period (GP) in the self-contained subframe structure.

Unlike a legacy LTE system operating based on a stationary DL/UL subframe configuration, an NR (New RAT) system may consider an operation of dynamically changing a DL/UL resource portion of a single subframe or a DL/UL resource portion (i.e., dynamic TDD) of a plurality of subframes according to DL/UL traffic status based on the aforementioned self-contained subframe type.

Meanwhile, in case of the self-contained subframe type, as shown in FIG. 3, a UL control channel can be transmitted with a DL data channel or a UL data channel in a subframe in a manner of being TDM while occupying one or a small number of symbol periods in consideration of latency reduction for data) e.g., DL data) transmission.

In general, it is anticipated that a TDD (time division duplex) scheme is basically to be used in mmWave band. In case of TDD, correlation exists between a DL band and a UL band due to reciprocity. In particular, if a specific band corresponds to a good channel, it is highly probable that UL also corresponds to a good channel in the specific band. And, the NR considers transmitting a DL control channel (e.g., DCI) by applying analog beamforming or digital beamforming to the DL control channel. Hence, it is highly probable that a frequency domain of a DL band according to the DCI has a good channel in UL as well. Hence, it is preferable to tie a frequency resource band between DCI and UCI as much as possible. It may consider DCI (downlink control information) and UCI (uplink control information) as control information. According to current LTE system, the DCI is transmitted through PDCCH and the UCI can be transmitted through PUCCH or PUSCH. And, in general, the UCI includes SR, HARQ ACK/NACK, and channel state information (CSI) and can be forwarded by such a format as PUCCH format 1/1a/1b/2/3. Yet, similar to a CRS, the NR system may consider supporting aperiodic CSI reporting only rather than periodic CSI reporting to maximize system resource flexibility.

Therefore, assume that the UCI is used for SR and HARQ ACK/NACK in the present invention.

The NR, i.e., mmWave region, considers DL/UL beamforming as a main feature and Blow 6 GHz also considers beamforming. In particular, as mentioned in the foregoing description, unlike the legacy LTE system, it is considered that beamforming is applied to DCI/UCI as well. In particular, a base station obtains CSI via CSI reporting. When the base station transmits UE-specific DCI, the base station can obtain an SNR gain by applying beamforming to both DCI and data.

In a TDD self-contained subframe structure, both DCI and UCI exist in a subframe at the same time. Hence, due to reciprocity between the DCI and the UCI, time correlation increases compared to legacy LTE TDD. Hence, it is necessary to design the subframe structure in consideration of beamforming between DL and UL and correlation between frequency bands.

The present invention proposes a resource allocation linkage method between DCI and UCI (e.g., HARQ ACK/NACK). First of all, an SR among the UCI is defined as a specific PUCCH format (e.g., xPUCCH format 1) and HARQ ACK/NACK is defined as a different specific PUCCH format (e.g., xPUCCH format 1a).

As one embodiment of the present invention, a linkage method between UE-specific DCI and a PUCCH format (e.g., xPUCCH format 1a) is proposed. In general, UE specific DCI transmitted by a base station can explicitly indicate not only a DL data position of a current subframe but also a time/frequency position at which ACK/NACK is transmitted. Yet, if the explicit method is used, it is apparent that DCI bit increases. Hence, it is necessary to have an implicit method for minimizing the DCI.

First of all, it is defined as the DCI is configured by the bundle of minimum unit REs of a DCCU (downlink control channel unit). Assume that the UCI is also configured in a UCCU (uplink CCU) unit.

In general, a size of information bits (e.g., 20 bit) of the DCI is greater than a size of information bits of ACK/NACK. Hence, assume that it is able to increase reliability by aggregating the DCI with a multiple of the DCCU.

The NR considers performing both UL and DL based on a CP-OFDM scheme. Hence, it may consider designing a symmetrical and common channel Assume a case that a size of the DCCU and a size of the UCCU are the same.

Figure 4:
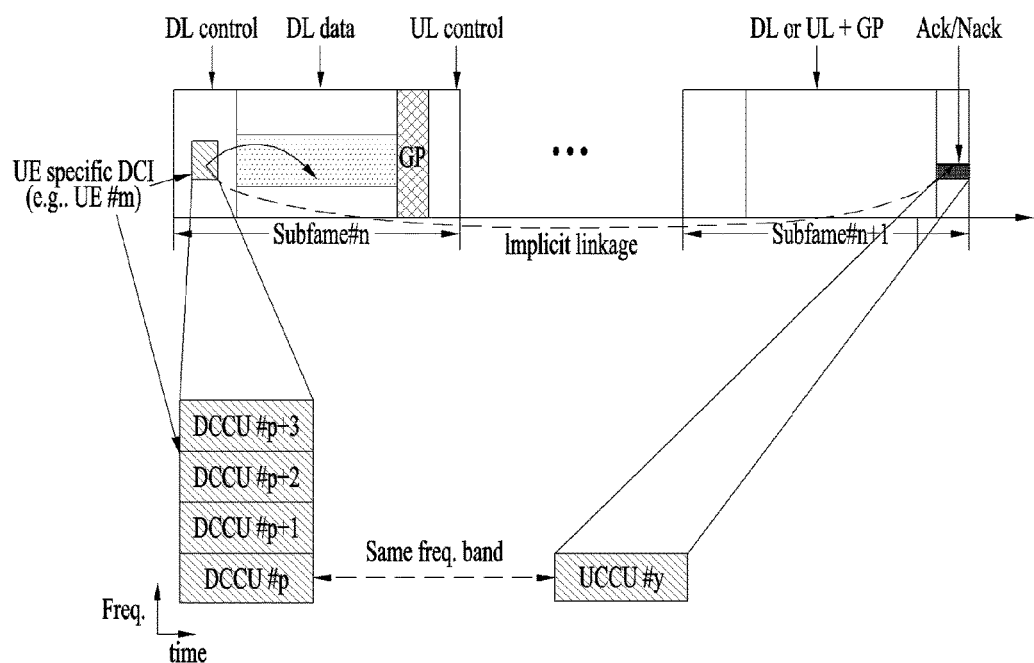
FIG. 4 is a diagram for explaining an example of a linkage method of DCI and UCI (e.g., ACK/NACK)

FIG. 4 is a diagram for explaining an example of a linkage method of DCI and UCI (e.g., ACK/NACK).

A base station transmits DL data corresponding to UE specific DCI (i.e., DL data indicated by UE specific DCI) to a UE. In this case, the UE specific DCI indicates ACK/NACK transmission timing only. In particular, the UE specific DCI transmitted in a subframe #n can indicate that the ACK/NACK transmission timing of the UE corresponds to a subframe #n+k which is appearing after a k subframe.

The UE detects the DL data corresponding to the UE specific DCI in the corresponding subframe (subframe #n) and transmits an ACK/NACK signal in response to the DL data through a frequency band of the same DCI and a frequency band of the same position UCI in the subframe (subframe #n). In this case, as shown in FIG. 4, the frequency band performs transmission using a UCCU of a position corresponding to a DCCU (in FIG. 4, DCCU #0) (i.e., a DCCU having a lowest index among a bundle of DCCUs) corresponding to a lowest frequency among a bundle of DCCUs in which the UE specific DCI is transmitted. In this case, the UE transmits the ACK/NACK signal in response to the DL data in a subframe (subframe #n+k) corresponding to the ACK/NACK timing indicated by the UE-specific DCI.

Referring to FIG. 4, the base station transmits DCI and DL data corresponding to the DCI to a UE #m. In this case, assume that the DCI includes 4 DCCUs. Subsequently, the UE determines ACK/NACK in response to the data in a UL control channel part after an indicated k subframe and transmits the ACK/NACK at a UCCU number (or index) corresponding to a lowest DCCU number (or index) among the DCCUs. In particular, the UE can transmit the ACK/NACK through the UCCU number (or index) corresponding to the lowest DCCU number (or index) in a subframe #n+k.

Or, if the UE specific DCI is transmitted at a frequency band corresponding to a highest DCCU index, the UE may transmit the ACK/NACK through a frequency band identical to a frequency band corresponding to the highest DCCU index.

As a different embodiment, a base station transmits UE specific DCI and DL data corresponding to the UE specific DCI. In this case, the UE specific DCI can indicate transmission timing of an ACK/NACK signal and information on whether or not repetition is performed (number of repetition transmission times or number of repetition). The UE detects the DL data corresponding to the UE specific DCI in a corresponding subframe and may be able to transmit ACK/NACK signal through a frequency band of an identical DCI and UCCU of an identical frequency band position in the subframe.

Figure 5:
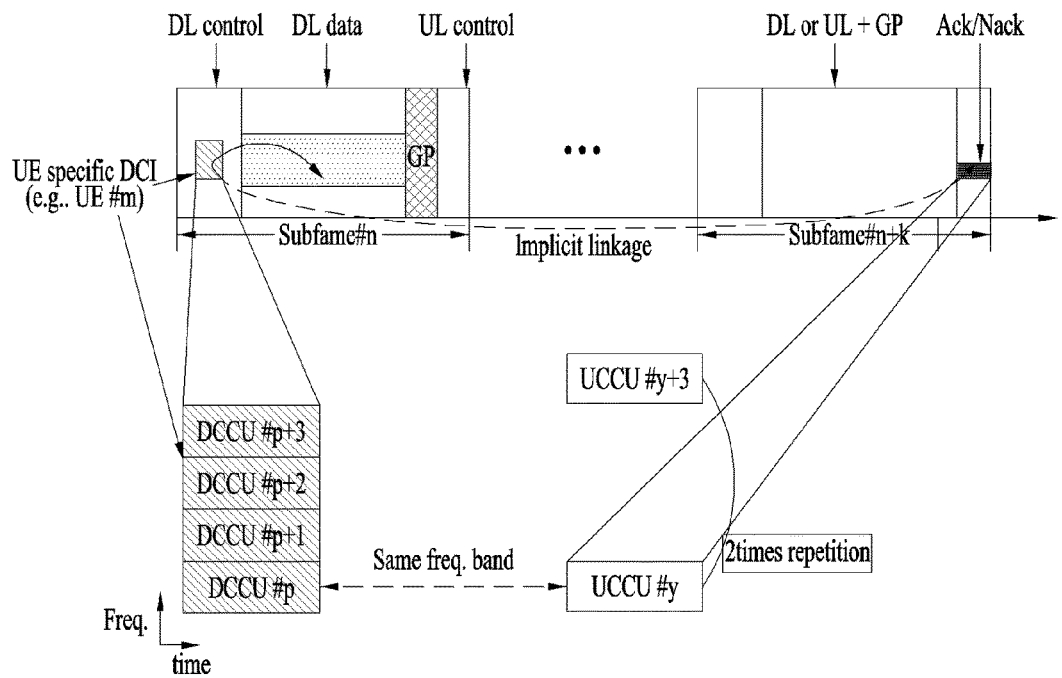
FIG. 5 is a diagram for a method of additionally indicating repetition in an embodiment mentioned earlier in FIG. 4.

FIG. 5 is a diagram for a method of additionally indicating repetition in an embodiment mentioned earlier in FIG. 4.

UE specific DCI can additionally include information on the extent of repetition (e.g., information on whether or not repetition transmission is performed or information on number of repetition transmission). A UE performs repetition according to the number of repetition transmission times indicated by the UE specific DCI. In particular, the UE can repeatedly transmit an ACK/NACK signal in a corresponding subframe according to the number of repetition transmission times indicated by the UE specific DCI. A repetition pattern can be shared between a UE and a base station in a manner of being predefined in advance.

FIG. 5 shows a case that repetition is performed two times. FIG. 5 shows an example that transmission is performed using a UCCU corresponding to a lowest frequency DCCU (UCCU #y) and a UCCU corresponding to a highest frequency DCCU (UCCU #y+3), respectively. Table 1 in the following indicates that DCI (UE specific DCI) includes a repetition field.

TABLE 1

| Time/frequency. Repetition field in DCI | 000 | 001 | 010 | 011 |
|---|---|---|---|---|
| number of repetition in frequency. | 1 | 2 | 3 | 4 |
| Time/frequency. Repetition field in DCI | 100 | 101 | 110 | 011 |
| number of repetition in time | 1 | 2 | 3 | 4 |

Referring to Table 1, as shown in FIG. 4 and FIG. 5, number of repetition in frequency indicates the number of times of repeatedly transmitting ACK/NACK in a different frequency band at the same time and number of repetition in time indicates the count of repeatedly transmitting ACK/NACK at a different time.

Table 1 is just an example only. Yet, as shown in Table 1, time/frequency indication and number of repetition times are respectively defined and can be operated in a manner of being combined with each other.

If DCI indicates the number of repetition in frequency, it may be able to bring about an effect of obtaining frequency diversity.

Figure 6:
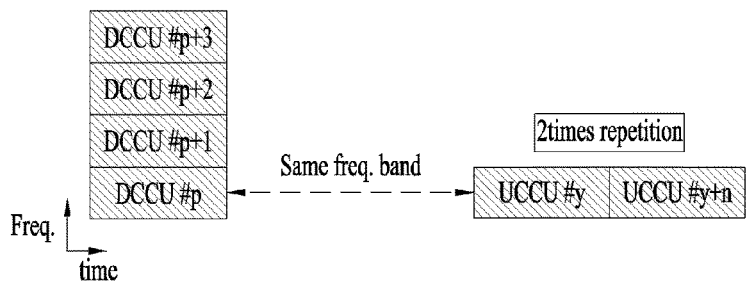
FIG. 6 is a diagram for explaining a different example of a linkage method of DCI and ACK/NACK UCI.

FIG. 6 is a diagram for explaining a different example of a linkage method of DCI and ACK/NACK UCI.

If it is able to extend a UCCU to a time symbol side, it may be able to perform time domain repetition. FIG. 6 shows a case that repetition is performed two times while a time repetition method is used. UE specific DCI can indicate whether repetition corresponds to time repetition or frequency repetition. The time repetition method can enhance reception capability by increasing power of a UE.

ACK/NACK is transmitted through a UCCU (in FIG. 6, UCCU #y, UCCU #y+n) corresponding to a frequency band identical to a DCCU #p in which UE specific DCI is received. This is because it is able to expect good performance by utilizing DL/UL reciprocity based on the self-contained structure of the NR.

If the count of performing the frequency domain repetition is greater than a DCCU aggregation level, it may follow a small number among the repetition counts. In particular, it may be able to represent as 'number of repetition times (or repetition count)=MM (repetition value, DCCU aggregation level)'. If the count of performing the time domain repetition is greater than a symbol count of an uplink control channel of a corresponding subframe, it may follow a small number among the repetition counts. In particular, it may be able to represent as 'number of repetition times (or repetition count) =MM (repetition value, UL control channel symbol number)'.

According to the aforementioned embodiment of the present invention, it is able to expect good communication performance by utilizing DL/UL reciprocity based on the self-contained structure according to DCI and UCI linkage method in the New RAT.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting uplink control information (UCI) by a user equipment (UE) in a wireless communication system, the method comprising:
   receiving downlink control information (DCI) indicating a transmission subframe of the UCI to be transmitted by the UE through a prescribed frequency band in a first subframe,
   wherein the DCI further indicates a number of repetitions of UCI transmission and frequency information for the repetition of the UCI transmission;
   receiving downlink data based on the DCI; and
   transmitting UCI associated with the downlink data through only a last symbol in a second subframe based on the DCI,
   wherein the UCI having a same physical uplink control channel (PUCCH) format is repetitively transmitted through both a first uplink control channel unit (UCCU) and a second UCCU within the prescribed frequency band on which the DCI is received, and both the first UCCU and the second UCCU are included in the last symbol, and
   wherein a frequency band of the first UCCU is different from a frequency band of the second UCCU.

2. The method of claim 1, wherein the UCI comprises a HARQ ACK/NACK signal.

3. The method of claim 1, wherein the prescribed frequency band on which the DCI is transmitted is configured by a plurality of downlink control channel units (DCCUs) for transmitting the DCI.

4. The method of claim 3, wherein the plurality of DCCUs are multiplexed by a frequency division multiplexing scheme and wherein each of the plurality of DCCUs is configured by a bundle of resource elements (REs).

5. A method for receiving uplink control information (UCI) by a base station in a wireless communication system, the method:
   transmitting downlink control information (DCI) indicating a transmission subframe of the UCI to be transmitted by a user equipment through a prescribed frequency band in a first subframe,
   wherein the DCI further indicates a number of repetitions of UCI transmission and frequency information for the repetition of the UCI transmission;
   transmitting downlink data based on the DCI; and
   receiving UCI associated with the downlink data through only a last symbol in a second subframe based on the DCI,
   wherein the UCI having a same physical uplink control channel (PUCCH) format is repetitively received through both a first uplink control channel unit (UCCU) and a second UCCU within the prescribed frequency band on which the DCI is transmitted, and the first UCCU and the second UCCU are included in the last symbol, and
   wherein a frequency band of the first UCCU is different from a frequency band of the second UCCU.

6. The method of claim 5, wherein the prescribed frequency band on which the DCI is transmitted is configured by a plurality of downlink control channel units (DCCUs) for transmitting the DCI.

7. The method of claim 6, wherein the plurality of DCCUs are multiplexed by a frequency division multiplexing scheme and wherein each of the plurality of DCCUs is configured by a bundle of resource elements (REs).

8. The method of claim 5, wherein the UCI comprises a HARQ ACK/NACK signal.

9. A user equipment (UE) for transmitting uplink control information (UCI) in a wireless communication system, the user equipment comprising:
   a receiver;
   a transmitter; and
   a processor, operatively coupled to the receiver and the transmitter, and configured to control:
      the receiver to receive downlink control information (DCI) indicating a transmission subframe of the UCI to be transmitted by the UE through a prescribed frequency band in a first subframe,
      wherein the DCI further indicates a number of repetitions of UCI transmission and frequency information for the repetition of the UCI transmission;
      the receiver to receive downlink data based on the DCI; and
      the transmitter to transmit UCI associated with the downlink data through only a last symbol in a second subframe based on the DCI,
      wherein the UCI having a same physical uplink control channel (PUCCH) format is repetitively transmitted through both a first uplink control channel unit (UCCU) and a second UCCU within the prescribed frequency band on which the DCI is received, and both the first UCCU and the second UCCU are included in the last symbol, and
      wherein a frequency band of the first UCCU is different from a frequency band of the second UCCU.

10. The UE of claim 9, wherein the prescribed frequency band on which the DCI is transmitted is configured by a plurality of downlink control channel units (DCCUs) for transmitting the DCI.

11. The UE of claim 10, wherein the plurality of DCCUs are multiplexed by a frequency division multiplexing scheme and wherein each of the plurality of DCCUs is configured by a bundle of resource elements (REs).

12. The UE of claim 9, wherein the UCI comprises a HARQ ACK/NACK signal.

13. A base station for receiving uplink control information (UCI) in a wireless communication system, the base station comprising:
   a transmitter;
   a receiver; and
   a processor, operatively coupled to the transmitter and the receiver configured to control:
      the transmitter to transmit downlink control information (DCI) indicating a transmission subframe of the UCI to be transmitted by a user equipment through a prescribed frequency band in a first subframe,
      wherein the DCI further indicates a number of repetitions of UCI transmission and frequency information for the repetition of the UCI transmission;
      the transmitter to transmit downlink data based on the DCI; and
      the receiver to receive UCI associated with the downlink data through only a last symbol in a second subframe based on the DCI,
      wherein the UCI having a same physical uplink control channel (PUCCH) format is repetitively received through both a first uplink control channel unit (UCCU) and a second UCCU within the prescribed frequency band on which the DCI is transmitted, and both the first UCCU and the second UCCU are included in the last symbol, and
      wherein a frequency band of the first UCCU is different from a frequency band of the second UCCU.

14. The base station of claim 13, wherein the prescribed frequency band on which the DCI is transmitted is configured by a plurality of downlink control channel units (DCCUs) for transmitting the DCI.

15. The base station of claim 14, wherein the plurality of DCCUs are multiplexed by a frequency division multiplexing scheme and wherein each of the plurality of DCCUs is configured by a bundle of resource elements (REs).

16. The base station of claim 13, wherein the UCI comprises a HARQ ACK/NACK signal.

* * * * *